L. H. JONES.
LOCK NUT.
APPLICATION FILED MAY 2, 1918.
1,341,175.
Patented May 25, 1920.
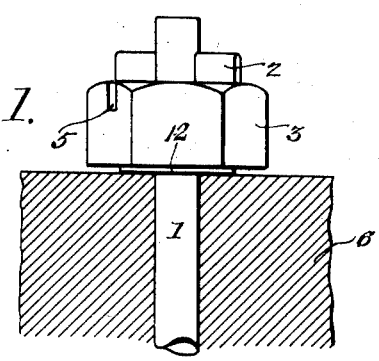
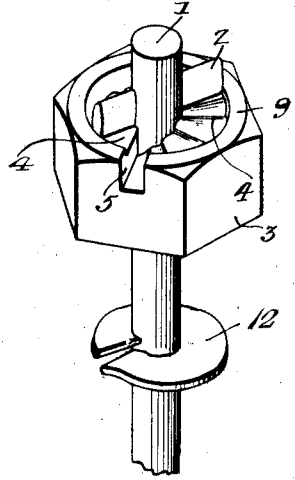
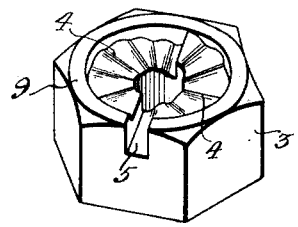
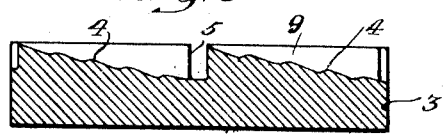
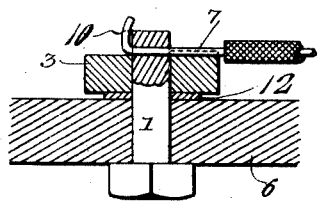
Inventor:
Lenora Hawkes Jones,
by her Attorneys,
Howson & Howson

UNITED STATES PATENT OFFICE.

LENORA H. JONES, OF WICHITA, KANSAS.

LOCK-NUT.

1,341,175.     Specification of Letters Patent.     Patented May 25, 1920.

Application filed May 2, 1918. Serial No. 232,133.

*To all whom it may concern:*

Be it known that I, LENORA HAWKES JONES, a citizen of the United States, residing in Wichita, Kansas, have invented the Improvements in Lock-Nuts, of which the following is a specification.

One object of my invention is to provide a novel construction and arrangement of nut, retaining member and bolt whereby said nut shall be maintained in any finally adjusted position even though it should be exposed to long continued vibration or severe shocks, the invention contemplating such a placing and formation of cam surfaces on the nut relatively to the retaining member as will permit of the former being set up or backed off by an ordinary wrench.

Another object of the invention is to provide a lock nut of simple and inexpensive construction with novel means for retaining in place the pin or bar for holding it in any set up or tightened position.

These objects and other advantageous ends I attain as hereinafter set forth, reference being had to the accompanying drawings in which, Figure 1 is a side elevation partly in section, illustrating the preferred form of my lock nut and its associated parts;

Fig. 2 is a perspective view of the parts shown in Fig. 1;

Fig. 3 is a perspective view of the nut showing a preferred disposition and form of its cam surfaces;

Fig. 4 is a perspective view of the cotter pin constituting part of my invention;

Fig. 5 is a diagram further illustrating the construction of the cam surfaces of my lock nut; and Fig. 6 illustrates my invention as utilized for connecting an electric wire to a bolt, post or equivalent member.

In the above drawings, 1 represents the stem or body of a bolt which, adjacent that one of its ends which would ordinarily be threaded, is provided with a transverse slot for the reception of a cotter pin 2 which is preferably though not necessarily, somewhat flattened in section. Rotatably mounted on the bolt adjacent the cotter pin is a nut 3 designed to coöperate with said bolt in the well known manner to hold any desired structures together or for any other desired purpose and between said nut and that structure next to it I preferably provide a spring washer 12.

The nut is peculiar in having its outer or top face recessed to provide two helical surfaces on which are formed two sets of radial cams or teeth 4 each consisting of a relatively long flat portion consisting of an inclined plane terminating in a relatively abrupt portion which drops to a slightly lower plane. The same end of the nut is also provided with a radial slot or passage 5 whose bottom is in line with the lowest of the cam surfaces or teeth of each set so that when the slot in the bolt 1 is in line with said slot 5, the cotter pin 2 may be inserted so that it projects equally on opposite sides of said bolt. It is noted that both of the sets of cam surfaces or teeth are below or to one side of the plane of the outer or top end of the nut 3 and that the length of the cotter pin is substantially the same as the diameter of the cylindrical recess whose bottom is formed by said teeth.

The slot in the body or stem 1 of the bolt is so placed that while it is possible to apply the nut 3 to said stem and insert cotter pin 2 when the slots of said parts are in line, the distance between the under side of said nut and the adjacent face of a structure 6 engaged thereby, or the amount to be taken up by the nut, is less than the total height of the cam surfaces of either set, *i. e.*, when the nut 3 is applied to the stem 1 and the cotter pin 2 is inserted through the slot 5 of said nut into the slot of said stem, the nut 3 may be turned in a clock-wise direction, whereupon the edge of said pin adjacent the nut will ride over the lower ones of the cam surfaces of each set, passing up the long inclined portions thereof and dropping behind their abrupt faces. As the space between the head of the bolt and the nut 3 is thus decreased, the effort necessary to turn the latter increases until after the spring washer has been more or less further flattened out any further turning of the nut is impossible. The cotter pin thereupon lodges back of the abrupt side of that one of the teeth or cam surfaces last passed over and the parts engaged by said nuts are thus held tightly together, any lost motion due to the slight backward turning of the nut necessary to bring the cotter pin against said abrupt sides being taken up by the spring washer 12. Even though the parts be now subjected to severe shocks or long continued vibration, the nut cannot back off of the bolt since the cotter pin is unable to pass over the steep sides of the adjacent teeth or cam surfaces.

The nut may be removed from the stem 1 by applying a wrench and forcibly turning it in a counter clock-wise direction so that its cam surfaces in engagement with the cotter pin are forced to move under the same until the slots of the nut and the stem 1 have been brought into line, when said pin may be removed and the nut taken off of the stem. By reason of the provision of the marginal flange 9 formed by making the cam surfaces or teeth below the plane of the outer face or top end of the nut, the cotter pin is effectually prevented from falling out of the stem or from removal except when the slots of the latter end of the nut are in alinement.

With the above described construction it is thus possible to prevent the loosening or accidental dislodgment of a nut from a bolt and at the same time to maintain said nut in any given position. Moreover, it may be set up or backed off by the use of an ordinary wrench and may be inexpensively manufactured since the nuts are preferably cast in final form ready for use.

In some cases the flange 9 for preventing longitudinal movement of the cotter pin may be omitted without departing from my invention but it would ordinarily be employed.

One important application of my invention is illustrated in Fig. 6 where a wire 7 such as is commonly employed as an electric conductor is to be mechanically as well as electrically connected to a bolt, spindle or pin 1 such for example as is commonly used as part of a rail bond.

In the above figure the structure 6 may be the web of a rail and, as before, the bolt or spindle 1 is provided with a transverse opening or passage adjacent one end into which the electric conductor 7 is placed, after the nut 3 with the spring washer 12 has been placed on said bolt. As before, the length of the bolt and the position of the hole therein bear such a relation to the thicknesses of the web and of the nut 3 as to just allow of the insertion of the wire 7 in said hole when the latter is in line with the lowest of the radial teeth or corrugations 4 of said nut.

After being inserted in the hole of the bolt, the free end 10 of the electric conductor is bent substantially at right angles to assist in holding it in place and the nut 3 is then turned in such a direction as to cause the straight body of the wire 7 as well as whatever part of its free end may still extend in the same general line, to successively engage the teeth or cam surfaces of the end of the nut until further turning is impossible. At such time the spring washer 12 is compressed to a maximum extent and the body of the wire frictionally engages the surface of one of the teeth so that good electric contact is obtained between it and the nut and bolt. Moreover on account of this frictional engagement aided by the action of the spring washer 12, backing off of the nut and loosening of the connection between the wire and the bolt is effectually prevented.

It will be noted that in this form of the invention the marginal flange is not necessary and it is to be understood that in some cases it may be omitted without departing from my invention.

Obviously the member described as a "cotter pin" may be any suitable structure extending transversely through the bolt and formed to coact with the cam surface on the outer face of the nut.

I claim:

1. The combination of a bolt having a stem; a cotter pin extending through said stem; with a nut rotatably mounted on the stem and including at least one series of stepped, radiating teeth formed to be successively engaged by the cotter pin as the nut is turned on the stem, said nut including a flange formed to normally prevent longitudinal movement of the cotter pin through the stem and provided with an opening to permit insertion of said cotter pin.

2. The combination of a bolt; a nut rotatably mounted thereon and having one face provided with two helical surfaces respectively formed with radially extending teeth; a cotter pin extending through the bolt in position to engage the teeth of the nut to cause it to move longitudinally of the bolt when it is turned thereon; with a flange on the nut in position to project over the ends of the cotter pin when the nut has been turned from a predetermined position into any of a plurality of adjusted positions.

In witness whereof I affix my signature.

LENORA H. JONES.